April 2, 1968  J. E. TATE  3,376,353

RECOVERY OF GLYCOLS FROM POLYESTER PRODUCTION

Filed March 17, 1967

INVENTOR.
JOHN E. TATE

BY *Kelly D. Corley*
ATTORNEY

United States Patent Office 3,376,353
Patented Apr. 2, 1968

3,376,353
RECOVERY OF GLYCOLS FROM POLYESTER
PRODUCTION
John E. Tate, Greenville, S.C., assignor to Monsanto
Company, St. Louis, Mo., a corporation of Delaware
Continuation-in-part of application Ser. No. 371,689,
June 1, 1964. This application Mar. 17, 1967, Ser.
No. 623,857
4 Claims. (Cl. 260—637)

ABSTRACT OF THE DISCLOSURE

Ethylene glycol vapors containing glycol-insoluble materials are condensed on a drum cooled and wetted by liquid glycol. The drum is scraped after the hot vapors impinge on it to remove any solid matter, and wetted with liquid glycol before re-contacting with the hot vapors.

---

This is a continuation-in-part of my co-pending application S.N. 371,689, filed June 1, 1964 and now abandoned.

This invention relates to an apparatus for the recovery of ethylene glycol in the manufacture of polyesters such as polyethylene terephthalate, and more particularly, to an apparatus for eliminating plugging of a glycol recovery condensing system by solids during the recovery of glycol from a polymerization reaction.

A novel class of fiber and film forming polymers comprising polyesters of terephthalic acid and polyethylene glycol containing from 2 to 10 carbon atoms is well-known in the art. A commercially important example of this class is polyethylene terephthalate which is prepared by carrying out an ester interchange reaction between ethylene glycol and dimethyl terephthalate followed by polymerization at elevated temperatures and reduced pressures. In this process, it is preferred to start with glycol in an amount in excess of the desired 1:1 ratio of the reactants to obtain a smooth reaction leading to a product having the desired degree of polymerization. From a commercial standpoint, it is known to be desirable to use from 1.5 to 1.9 mols of glycol per mol of dimethyl terephthalate. During the polymerization reaction it is therefore economically desirable to recover excess glycol for further use, and this recovery is generally effected by condensing reaction vapors high in glycol content and returning the glycol to the process.

In the recovery and condensation of the glycol. it has been found that the glycol vapors carry with them glycol-insoluble polymeric esters of terephthalic acid and these glycol-insoluble materials rapidly become deposits of hard crystalline material in glycol condensation apparatus. Because of this, in a short time the recovery system becomes plugged, preventing the maintenance of low pressures in polymerization vessels and interfering with smooth operation of polyester polymerization processes.

It is an object of this invention to provide an apparatus and process for recovering ethylene glycol. Another object is to provide an apparatus and process in which plugging of the recovery system is avoided. These and other objects will become apparent from the following description and claims.

Figure 1:
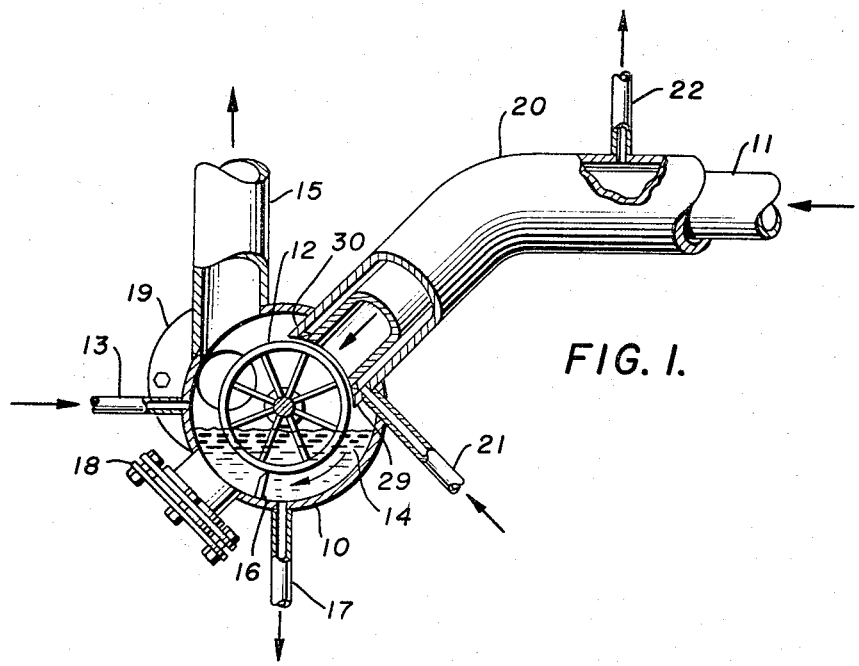
Figure 2:
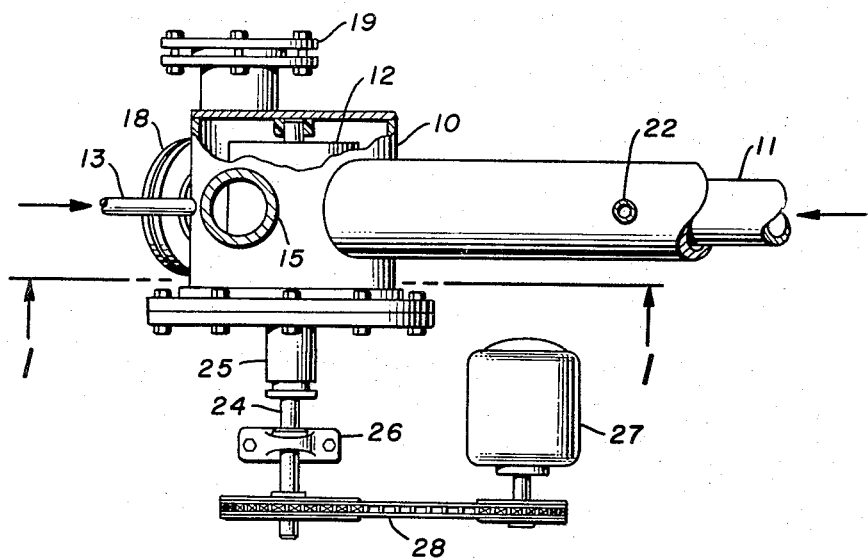

The objects of this invention are accomplished generally by a process and apparatus which comprise a rotating drum condenser. The apparatus of this invention is illustrated in the accompanying drawing wherein FIGURE 1 is an elevation view, partly cut away, of an embodiment of the apparatus of this invention taken along section 1—1 of FIGURE 2, and FIGURE 2 is a top view, partly cut away, of an embodiment of the apparatus of this invention.

Referring now to the figures, glycol-ester vapor from a polymerization reaction vessel (not shown) enters rotating drum condenser 10 through inlet pipe 11 and impinges upon rotating drum 12. Recirculating glycol enters the apparatus by inlet 13 to glycol pool 14. Entrained and condensable glycol and glycol-insoluble vapors strike chilled drum 12 which is rotating and the remaining vapor which is substantially free of glycol and other condensables proceeds through vapor outlet 15 to a vacuum source not shown.

Condensed material on rotating drum 12 is removed by scraper bar 16 located in the glycol pool 14. Since scraper 16 is within glycol pool 14, the surface of drum 12 is wetted with cool glycol after being scraped and before returning for further contact with the hot vapors. The resulting liquid glycol film on drum 12 substantially reduces the tendency of the glycol-insoluble material to adhere to drum 12. Scraper bar 16 may be located within the liquid, as illustrated, or between the point where the hot gaseous mixture impinges on drum 12 and liquid 14. The essential cooperation is provided by wetting the scraped drum surface before impingement of the hot vapors thereon: this greatly reduces the tendency of the esters to condense on and adhere to the metal drum surface since most of the esters do not penetrate the liquid glycol film on the drum surface. Liquid glycol containing insoluble material removed from rotating drum 12 by scraper bar 16 exits from glycol pool 14 by outlet 17 to a suitable filter and cooling system where the entrained solids contained in the glycol are removed, and the filtered glycol is cooled for recycle to the system. The temperature of the glycol being returned to the chilled drum condenser from the cooling system may be from 35°C. to 45°C. or lower if very low pressures are required in the vacuum system. Sight glass mounting 18 may be provided to observe the glycol liquid level within the rotating drum condenser and the cleanliness of the surface of rotating drum 12. Cleaning port 19 is provided for routine cleaning of the apparatus should it be necessary. Glycol may be added to or withdrawn from the system after filtering and cooling, should the liquid level in the apparatus become too high or too low.

The composition of the incoming glycol vapor varies depending upon the degree of polymerization of the reaction mixture from which glycol is being obtained, the operating conditions of the process, and the particular design of the reaction system and the finishing vessels, if any. In general, glycol vapor obtained in the manufacture of terephthalates will contain from 1–5%, by weight, of terephthalate esters and polyesters. Of this material it has been found generally that 0.05% to 1.0%, based on the total weight of the glycol vapor, is material insoluble in glycol.

In order to minimize deposition of these glycol-insoluble substances in and along any portion of inlet pipe 11, it is heated along its entire length by jacketing means 20 or other suitable heating means. Jacketing means 20 may be heated by any means such as Dowtherm or other suitable material entering at 21 and exiting at 22. In general, vapor entering the rotating drum condenser will be maintained at a temperature of 265° C to 300°C. by the heated inlet pipe until the vapor contacts the rotating drum within the rotating drum condenser.

The design of the section of the inlet pipe 11 within the rotating drum apparatus should be controlled so that vapor carrying entrained solids will not be permitted to by-pass the rotating drum and condense in unwanted areas, such as within exit pipe 15 or that portion of the inlet pipe within the condenser to cause plugging of the vacuum system. It has been found that these problems can be prevented by providing a substantially uniform clearance between rotating drum 12 and discharge section 29 of inlet pipe 11 of one-eighth inch to three inches for successful operation of the apparatus.

In FIGURE 2 like numbers refer to like parts as described previously. Rotating drum 12 within rotating drum condenser 10 may be driven by shaft 24 extending through bearing and bushing 25 and supported by support means 26. Motor means 27 and drive means 28 are shown, however, it is clear that any suitable means for rotating the drum within the condenser at rates of rotation is applicable.

The rotational rate of the drum within the apparatus is dependent upon the diameter of the drum, the surface area of the drum and the amount of entrained solids in the vapor. During operation of the apparatus, the rotational rate of the drum should be at a sufficient rate to provide adequate removal of condensed solids from the surface of the drum adjacent to discharge section 29. If rate of rotation is too rapid, splashing of glycol on the hot surface of the inlet section 30 of pipe 11 may result in flashing of glycol which will cause a vacuum loss in the system. It has been found that regardless of these criteria, a rotational rate of 5 r.p.m. to 150 r.p.m. may be used for the drum with a preferred rate being 10 to 40 revolutions per minute.

It is clear also that internal cooling of the drum, by minor modification of the embodiment shown, may be used, if desired. Also, perforations may be made in the rotating drum surface to aid in the cooling thereof and the removal of particular matter condensed thereon, if desired.

As an example of a rotating drum condenser particularly adapted for glycol recovery in the polymerization of polyethylene terephthalate, a rotating drum was fabricated from a 12″ length of 12″ stainless steel pipe with suitable shaft supports welded to the interior periphery of the pipe and inserted horizontally in a drum housing 14″ in diameter and approximately 15 inches long. The inlet pipe for vapor from the polyester polymerization system was fabricated from 8″ stainless steel pipe suitably jacketed for Dowtherm heating and was mounted partially within the drum housing at an angle of 45° to the horizontal with the end adjacent to the rotating drum contoured to conform to the diameter of the drum. The clearance between the surface of the rotating drum and the contoured end of the inlet pipe was one inch, and in operation the drum was rotated at 10 r.p.m. It is to be understood that these specific parameters are merely illustrative and are not critical to the invention.

It may be seen from the foregoing description and the accompanying drawings that the rotating drum condensing system according to this invention provides rapid and efficient removal of glycol-insoluble condensed materials from the glycol vapor without the disadvantage of many operational shutdowns due to plugging of the vacuum system. A further advantage is the simplicity of design which permits the easy fabrication of an apparatus so necessary to good polymerization operation.

As many widely different embodiments may be made without departing from the spirit and scope of this invention, it is to be understood that said invention is not to be restricted in any way except as set forth in the appended claims.

I claim:
1. In a process for the continuous condensation of liquid glycol from a heated varporous mixture of glycol and substantially glycol-insoluble esters, the improvement which comprises, in combination, the steps of:
   (a) heating said vaporous mixture to a temperature of 265° C. to 300° C.;
   (b) scraping a moving endless surface;
   (c) wetting and cooling said scraped surface by direct contact with cooled liquid glycol;
   (d) impinging said heated mixture on said wetted cooled surface,
   (e) collecting the mixture of liquid glycol and said substantially glycol-insoluble esters, and
   (f) separating said liquid glycol from said esters.
2. The process defined in claim 1, wherein at least a portion of said separated glycol is recirculated for further contacting of said straight surface.
3. A process defined in claim 1, wherein said step of scraping is performed while said surface is immersed in liquid glycol.
4. In a process for the continuous condensation of liquid glycol from a heated vaporous mixture of glycol and substantially glycol-insoluble esters, the improvement which comprises, in combination, the steps of:
   (a) heating said vaporous mixture to a temperature of 265° C. to 300° C.;
   (b) wetting a scraped moving surface with cooled liquid glycol;
   (c) impinging said heated mixture on said wetted surface;
   (d) scraping said surface to remove condensed materials therefrom, and
   (e) separating liquid glycol from the remainder of said condensed materials.

References Cited
UNITED STATES PATENTS

| | | | |
|---|---|---|---|
| 2,483,254 | 9/1949 | Almy | 260—637 |
| 2,793,235 | 5/1957 | Jenkinson | 260—637 |
| 2,883,162 | 4/1959 | Rapson | 165—111 |
| 3,021,831 | 2/1962 | Byrge | 261—92 |

LEON ZITVER, *Primary Examiner.*

J. EVANS, *Assistant Examiner.*